US005281034A

United States Patent [19]

Hertlein

[11] Patent Number: 5,281,034

[45] Date of Patent: Jan. 25, 1994

[54] SHAFT FITTED ROTATABLY IN THE CASING OF A PRESSURE CHAMBER

[75] Inventor: Walter J. Hertlein, Möchengladbach, Fed. Rep. of Germany

[73] Assignee: H & K Antriebstechnik GmbH, Hückelhoven-Baal, Fed. Rep. of Germany

[21] Appl. No.: 860,518

[22] PCT Filed: Oct. 17, 1991

[86] PCT No.: PCT/EP91/01975

§ 371 Date: Jun. 16, 1992

§ 102(e) Date: Jun. 16, 1992

[87] PCT Pub. No.: WO92/07195

PCT Pub. Date: Apr. 30, 1992

[30] Foreign Application Priority Data

Oct. 19, 1990 [DE] Fed. Rep. of Germany ... 9014487[U]

[51] Int. Cl.[5] ........................ F16C 17/00; F16C 33/72; F01B 31/00

[52] U.S. Cl. ........................................ 384/275; 92/136; 384/152; 384/296

[58] Field of Search ............... 384/152, 276, 275, 295, 384/296, 297, 299, 416, 417; 92/136

[56] References Cited

U.S. PATENT DOCUMENTS

| | | | |
|---|---|---|---|
| 2,844,127 | 7/1958 | Steiner | 92/136 X |
| 3,040,717 | 6/1962 | Rumsey | 92/136 |
| 3,148,595 | 9/1964 | Looney | 92/11 |
| 3,246,581 | 4/1966 | Carr | 92/136 |
| 3,776,611 | 12/1973 | Jentsch | 384/152 |
| 3,982,725 | 9/1976 | Clark | 92/136 X |
| 4,281,588 | 8/1981 | Jaske | 92/136 X |

*Primary Examiner*—Thomas R. Hannon

*Attorney, Agent, or Firm*—Anderson Kill Olick & Oshinsky

[57] ABSTRACT

The support of a shaft (7) which is rotatably supported in through-holes of the housing (1) of a pressure chamber in bushes (11, 12) provided with sealing rings and which is secured against axial displacement by securing rings (21, 22) is to be improved in such a way that a low-wear and secure arrangement of the shaft (7) and bearing bushes (11, 12) is achieved. For this purpose, it is suggested that each through-hole (9, 10) of the housing (1) comprise a collar (15, 16) which projects radially inward and forms a support for a projection which is directed radially outward and with which each bush (11, 12) is provided, the front side (19, 20) of the latter facing the pressure chamber simultaneously forming a support for a securing ring (21, 22) arranged on the shaft (7), wherein the two bearing sides of the shaft (7) have the same diameter.

2 Claims, 1 Drawing Sheet

SHAFT FITTED ROTATABLY IN THE CASING OF A PRESSURE CHAMBER

Figure 1:
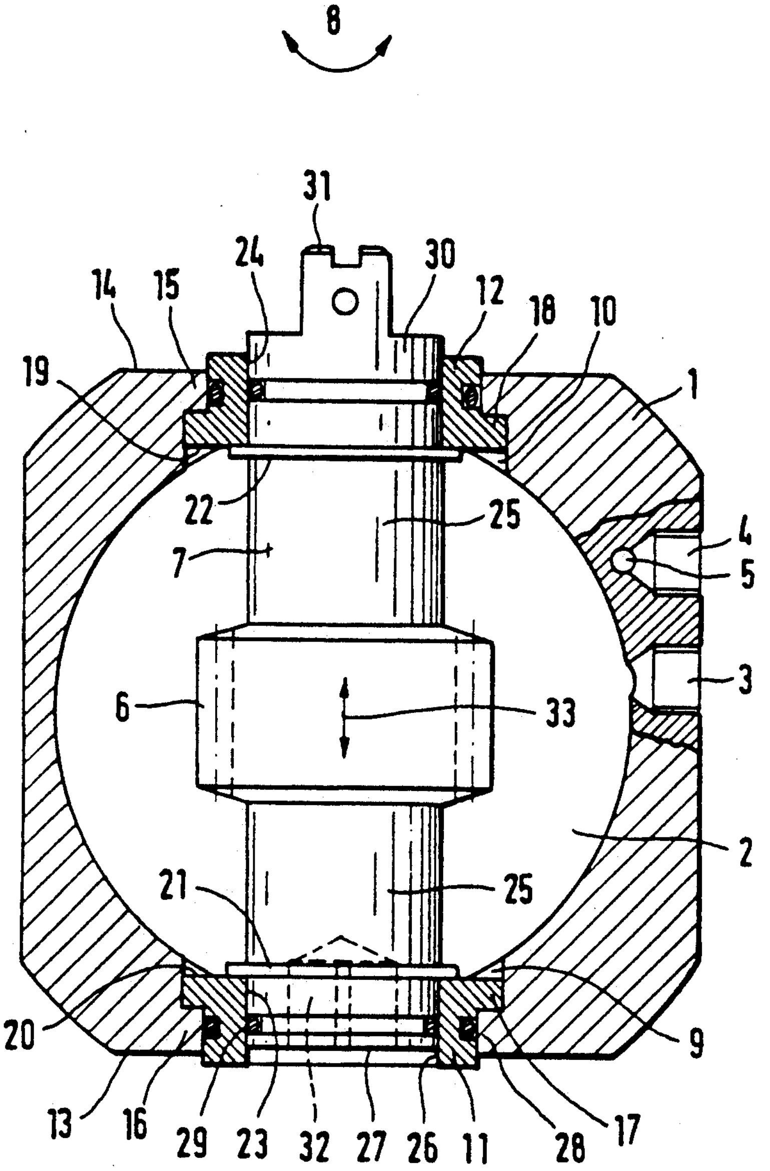

The invention is directed to a shaft which is rotatably supported in through-holes of the housing of a pressure chamber in bushes and secured against axial displacement by securing rings, as well as to sealing rings between the bearing side of the shaft and the bush on one side and between the bush and the housing on the other side.

Bushes can be provided for the rotatable support of a shaft in a housing which are guided through the wall of the housing and supported on the wall. The bush is recessed into the wall of the housing and can also be screwed, wedged or pinned to the wall in addition. Every bush has an external annular flange by means of which the bush is supported on the wall in the axial direction of the shaft from the outside, that is from the side of the wall of the housing remote of the pressure chamber. A securing ring which is placed from the outside on each end of the shaft projecting out of the bushes forms the closure and is supported on the outside end faces of the bushes. The axial position of the rotatable shaft within the housing is fixed by means of this arrangement. The securing rings accordingly fix the shaft in its position in relation to the housing so that the shaft can not wander out or be pulled or pushed out of the housing in either axial direction (DE-OS No. 34 43 302).

Although the known arrangement has the advantage that it can be mounted in a simple manner, it nevertheless has a number of disadvantages:

the securing rings can wear easily because the end faces of the bushes facing the pressure chamber are constantly acted upon by pressure;

due to the application of pressure on the bushes, the shaft, in turn, is constantly acted upon by tensile force via the securing rings;

when a securing ring breaks, the respective bearing bush also loses its secure support. If the pressure force acting on the front annular surface of the bush exceeds the force by which the bush is held in the housing, the latter can be suddenly detached and thrown out in the manner of a projectile;

the securing rings are constantly loaded and therefore generate high friction.

Based on these disadvantages the object of the present invention is to improve the known support of the rotatable shaft in the housing of the pressure chamber in such a way that a wear-resistant and secure arrangement of the shaft and bearing bushes is achieved.

This object is met in that every through-hole of the housing comprises a collar which projects radially inward and forms a support for a projection which is directed radially outward and with which every bush is provided, and the front side of the latter facing the pressure chamber simultaneously forms a support for a securing ring arranged on the shaft, wherein the two bearing sides of the shaft have the same diameter. The shaft is accordingly relieved of tension and the bearing bushes can not be propelled out by the internal pressure of the housing. The securing rings are likewise relieved of tension so that there is no longer any frictional wear. The equivalence in diameter of the bearing sides ensures that no axial force is applied via the shaft itself.

The invention is described in more detail in the following with reference to an embodiment example:

FIG. 1 shows a cross section through a pressure cylinder. Such cylinders comprise two pistons which are movable in opposite directions, each piston comprising a toothed rack meshing with the pinion of the rotatable shaft and accordingly rotating the shaft when moved.

The housing 1 of the pressure cylinder encloses the cylindrical pressure chamber 2 which extends vertically in end-to-end length with respect to the drawing plane of the figure. The pressure chamber 2 is filled with a pressure medium, e.g. compressed air or hydraulic fluid, via a connection 3. The pressure medium is removed from the pressure chamber 2 via a connection 4 which opens into an axial bore hole 5. The inlet and outlet of the pressure medium is controlled e.g. via valves and/or slides (not shown) which are arranged outside the housing 1 and communicate with the connections 3 and 4 in a conventional manner via line connections (not shown).

A piston, for example, (not shown) is guided in the cylindrical pressure chamber 2 so as to be longitudinally movable vertically with respect to the drawing plane in the figure. The movement of the piston is caused by the pressure medium which can flow in and out via the connections 3 and 4. The pistons move in one or the other axial direction, i.e. vertically in relation to the drawing plane of the figure, depending on the connection 3 or 4 through which the pressure medium flows in or out.

Each piston is provided with a toothed rack, in a manner known per se, which engages in the gear tooth pinion 6 of the shaft 7 which is rotatably supported in the housing 1. The pistons accordingly transmit their respective longitudinal movement inside the pressure chamber 2 to the rotatable shaft 7 and cause the shaft 7 to execute a corresponding rotating movement in the direction of the curved double arrow 8. The magnitude of this rotating movement 8 can range from a few angular degrees to several complete revolutions. The piston and toothed rack can thus be moved in opposite directions.

The rotatable shaft 7 is rotatably supported in opposite through-holes 9 and 10 of the housing 1 in bushes 11 and 12 and has the same diameter on both bearing sides. Each of the through-holes 9 and 10 comprises a collar 15 and 16 projecting radially inward on the side 13 and 14 of the housing 1 remote of the pressure chamber 2, which collar 15 and 16 forms a support for an annular flange 17 and 18 with which every bush 11 and 12 is provided. The bushes 11 and 12 are pressed against the collars 15 and 16 of the two through-holes 9 and 10 by their annular flanges 17 and 18 under the pressure force of the pressure medium in the pressure chamber 2 acting on the inside end face 19 and 20 of the bushes 11 and 12 facing the pressure chamber 2 and are securely held by the collars 15 and 16.

The end faces 19 and 20 also serve simultaneously as a support for securing rings 21 and 22 which define the bearing seats 23 and 24 toward the shank 25 of the rotatable shaft 7 and are recessed into the rotatable shaft 7. As can also be seen from the drawing, the two securing rings 21 and 22 prevent the rotatable shaft 7 from wandering out of the housing 1 in the axial direction 33 but are not axially loaded so that only slight friction occurs in this location during a rotating movement of the shaft.

Assuming that the pressure chamber 2 is opened, e.g. by a cover (not shown), in a plane not situated in the drawing plane of the figure but parallel thereto, the rotatable shaft is mounted in the housing 1 approximately as follows:

The bush is first inserted into the through-hole 10. The shaft 7 is then inserted into the pressure chamber 2 through the free through-hole 9 and, with the securing ring 22 slid loosely on the shank 25 up to the pinion 6, pushed through the bush 12 along the free length of the shank 25. The second bush 11 is then inserted into the through-hole 9. The lower end 27 of the shaft 7 is then threaded into the inner bore hole 26 until the previously inserted securing ring 21 abuts at the end face 20. The other securing ring 22 is then slipped back over the shank 25 and locked into the groove (not shown) of the shank 25 provided for this purpose in front of the front side 19 of the bush 12.

For the sake of completeness, it is noted that O-seals 28 are provided between the bushes 11 and 12 for sealing the through-holes 9 and 10. Similarly, O-seals 29 are arranged between the shaft 7 and the bushes 11 and 12 for sealing the bearing seats 23 and 24. The upper end 30 of the shaft 7 ends in a projecting pin 31, whereas a recess 32 is formed in the lower end 27 which can be provided with key faces.

List of Reference Numbers

1 housing
2 cylindrical pressure chamber
3 connection
4 connection
5 axial bore hole
6 gear tooth pinion
7 rotatable shaft
8 rotating movement
9 through-hole
10 through-hole
11 bush
12 bush
13 side remote of the pressure chamber
14 side remote of the pressure chamber
15 collar projecting radially inward
16 collar projecting radially inward
17 annular flange
18 annular flange
19 inside end face
20 inside end face
21 securing ring
22 securing ring
23 bearing seat
24 bearing seat
25 shank
26 inner bore hole
27 lower end
28 O-seal
29 O-seal
30 upper end
31 projecting pin
32 recess
33 axial direction

What is claimed is:

1. An assembly, comprising:

a one-piece housing defining a pressure chamber and having axially opposite through-bores, wherein a housing wall portion, which defines each of said through-bores, has a radially inwardly projecting collar;

bearing bushes located in said through-bores, respectively, and having each a radially outwardly directed projection, which rests against a respective collar under pressure generated in said pressure chamber and acting on an end surface of said projection facing said pressure chamber;

a rotatable tooth gear shaft located in said pressure chamber and having a toothed gear and opposite bearing shank portions of an equal diameter, which extend from opposite side surfaces of said toothed gear and which are supported in said bearing bushes;

sealing rings arranged, respectively, between said bearing bushes and housing walls, which define said through-bores, and between said bearing shank portions and said bearing bushes; and securing rings for retaining said toothed gear shaft against axial displacement, wherein said securing rings rest against respective end surfaces of respective projections of said bearing bushes.

2. The assembly of claim 1, wherein said projection is formed as an annular flange of a respective bearing bush.

* * * * *